(12) United States Patent
Gobezie et al.

(10) Patent No.: US 11,992,729 B2
(45) Date of Patent: May 28, 2024

(54) MEASURING A PULL FORCE ON AN EXERCISE BAND

(71) Applicant: PT Genie, LLC, Orlando, FL (US)

(72) Inventors: Reuben Gobezie, Orlando, FL (US); Laurence D. Higgins, Brookline, MA (US)

(73) Assignee: PT GENIE, LLC, Orlando, FL (US)

( * ) Notice: Subject to any disclaimer, the term of this patent is extended or adjusted under 35 U.S.C. 154(b) by 0 days.

(21) Appl. No.: 18/353,643

(22) Filed: Jul. 17, 2023

(65) Prior Publication Data

US 2023/0356032 A1 Nov. 9, 2023

Related U.S. Application Data

(63) Continuation of application No. 17/313,559, filed on May 6, 2021, now Pat. No. 11,701,547.

(Continued)

(51) Int. Cl.
*A63B 24/00* (2006.01)
*A63B 21/055* (2006.01)
*A63B 71/06* (2006.01)

(52) U.S. Cl.
CPC ...... *A63B 24/0062* (2013.01); *A63B 21/0552* (2013.01); *A63B 71/0622* (2013.01); *A63B 2024/0065* (2013.01); *A63B 2071/0647* (2013.01); *A63B 2071/0655* (2013.01); *A63B 2220/16* (2013.01); *A63B 2220/17* (2013.01); *A63B 2220/40* (2013.01); *A63B 2220/51* (2013.01); *A63B 2220/806* (2013.01); *A63B 2220/836* (2013.01); *A63B 2225/20* (2013.01)

(58) Field of Classification Search
CPC ............ A63B 24/0062; A63B 21/0552; A63B 71/0622; A63B 2024/0065; A63B 2071/0647; A63B 2071/0655; A63B 2220/16; A63B 2220/17; A63B 2220/40; A63B 2220/51; A63B 2220/806; A63B 2220/836; A63B 2225/20
USPC ......................................................... 700/91
See application file for complete search history.

(56) References Cited

U.S. PATENT DOCUMENTS 9,198,622 B2   12/2015   Kaleal
9,199,122 B2   12/2015   Kaleal
(Continued)

FOREIGN PATENT DOCUMENTS

WO    2011041678 A1   4/2011

*Primary Examiner* — Allen Chan
(74) *Attorney, Agent, or Firm* — TAROLLI, SUNDHEIM, COVELL & TUMMINO L.L.P.

(57) ABSTRACT

A patient can undergo physical therapy to rehabilitate a musculoskeletal condition. The success of the rehabilitation relies in part on whether the patient uses an exercise band with the correct resistance for their condition. In order to select the correct resistance, a controller can instruct the patient to perform a directed movement with an exercise band, receive exercise data from at least one sensor (e.g., a camera, like a front-facing camera, that records the patient, a plurality of sensors on or near the patient's skin, etc.) as the subject performs the directed movement, and calculate a pull force exerted by the patient on the exercise band based on at least a portion of the exercise data. The adequacy of an exercise with the exercise band for the patient is determined based on the pull force can be determined based on the calculated pull force.

20 Claims, 10 Drawing Sheets

Related U.S. Application Data

(60) Provisional application No. 63/020,844, filed on May 6, 2020.

(56) References Cited

U.S. PATENT DOCUMENTS

| | | |
|---|---|---|
| 9,501,942 B2 | 11/2016 | Kaleal |
| 9,561,400 B2 | 2/2017 | Soerensen |
| 9,610,469 B2 | 4/2017 | Mutch |
| 9,652,992 B2 | 5/2017 | Kaleal |
| 9,842,508 B2 * | 12/2017 | Crabtree .................. G09B 5/08 |
| 10,493,323 B2 | 12/2019 | Hyde |
| 11,027,172 B2 | 6/2021 | Osbrink |
| 2008/0119763 A1 | 5/2008 | Wiener |
| 2011/0251021 A1 | 10/2011 | Zavadsky |
| 2013/0233097 A1 * | 9/2013 | Hayner .................... A61B 5/11 |
| | | 73/865.4 |
| 2014/0081661 A1 | 3/2014 | Fu |
| 2015/0004581 A1 | 1/2015 | Selman |
| 2015/0169763 A1 | 6/2015 | Damman |
| 2016/0220808 A1 * | 8/2016 | Hyde .................... A61B 5/6804 |
| 2016/0325132 A1 | 11/2016 | Nelson |
| 2019/0290962 A1 | 9/2019 | Osbrink |

* cited by examiner

MEASURING A PULL FORCE ON AN EXERCISE BAND

CROSS-REFERENCE TO RELATED APPLICATIONS

This application is a Continuation of U.S. Non-Provisional application Ser. No. 17/313,559, filed May 6, 2021, which claims the benefit of U.S. Provisional Application No. 63/020,844, filed May 6, 2020, each of which is hereby incorporated by reference in its entirety for all purposes.

TECHNICAL FIELD

The present disclosure relates generally to physical therapy and, more specifically, to systems and methods for measuring a pull force on an exercise band used for physical therapy.

BACKGROUND

Physical therapy can be used so that a patient gains strength. Exercise bands are assigned to patients for various physical therapy exercises based on the rating of the band. By relying on patient feedback and intermittent monitoring of exercises, the physical therapist may not recognize that it is too easy or too hard for a patient to use a specific exercise band for a specific exercise.

SUMMARY

Provided herein is a solution for assigning an exercise band for a patient to use during an exercise. The systems and methods described herein can measure a pull force on an exercise band, information that can be used to select the exercise band for the patient to use during the exercise.

In one aspect, the present disclosure can include a system for determining the adequacy of an exercise band. The system includes at least one sensor to transmit exercise data when the subject uses the exercise band. The system also includes a controller comprising a non-transitory memory storing instructions and a processor to execute the instructions stored in the memory to perform operations. The operations include instructing the subject to perform a directed movement with the exercise band; receiving the exercise data as the subject performs the directed movement; and calculating a pull force of the subject on the exercise band based on at least a portion of the exercise data. The adequacy of an exercise with the exercise band for the patient is determined based on the pull force.

In another aspect, the present disclosure can include a method for determining the adequacy of an exercise band. The method can be performed by a controller comprising a processor, which can instruct a subject to perform a directed movement with an exercise band; receive exercise data from at least one sensor as the subject performs the directed movement; and calculate a pull force of the subject on the exercise band based on at least a portion of the exercise data. The adequacy of an exercise with the exercise band for the patient is determined based on the pull force.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

I. Definitions

Figure 1:
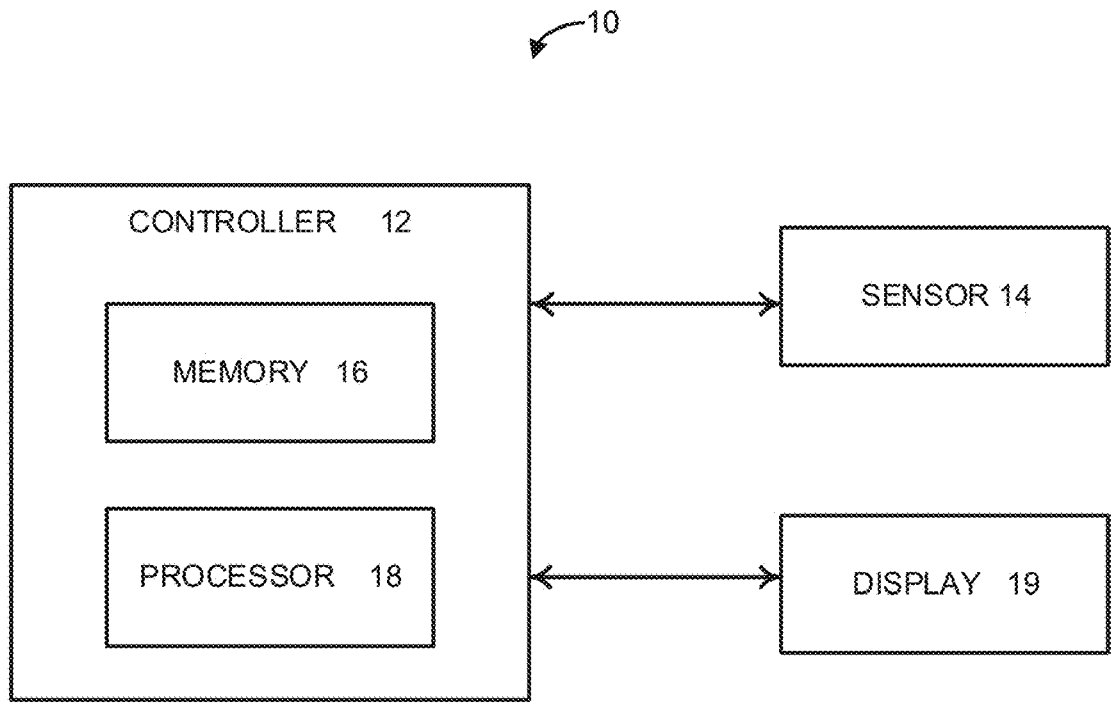
FIG. 1 is a diagram showing an example of a system that can measure a pull force on an exercise band.

Unless otherwise defined, all technical terms used herein have the same meaning as commonly understood by one of ordinary skill in the art to which the present disclosure pertains.

As used herein, the singular forms "a," "an" and "the" can also include the plural forms, unless the context clearly indicates otherwise.

As used herein, the terms "comprises" and/or "comprising," can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "physical therapy" can refer to the treatment of an weakness by physical methods like exercise. The weakness can be an orthopedic weakness caused by disease, injury, deformity, age, surgery, or the like. Physical therapy can encompass exercise, athletics, athletic training, occupational therapy, physical therapy, or any treatment of a weakness by physical methods.

As used herein, the term "joint" can refer to a connection made between two or more bones in the body for purposes of permitting body parts to move. Examples of common joints include, but are not limited to, the knee, the elbow, the shoulder, the spine, the hip, the ankle, the wrist, the articulations of the foot, and the articulations of the hand.

As used herein, the term "exercise band" can refer to elastic bands, tension bands, strength bands, resistance bands, tubing, or any other type of band used for physical therapy and exercise purposes. The color of an exercise band is generally used to note the resistance, i.e., light, medium, heavy, etc., with the heaviest bands being the hardest to stretch and pull. An exercise band can have no handles, have plastic handles attached to one or both ends, have an ankle cuff attached to one or both ends, be a continuous flat loop, be shaped as a figure eight with two handles, or any other known configuration.

As used herein, the term "pull force" can refer to the force a subject exerts on the exercise band during a directed movement.

As used herein, the term "animated figure" can refer to a video or simulation of a person that displays the exercises in a patient's plan of care. The animated figure can show the exercises in a step by step manner or as a continuous movement. The animated figure can be 2D or 3D. The animated figure can be accompanied by verbal, written, or pictorial instructions to help a patient understand the exercise movements.

As used herein, the term "sensor" can refer to a device that detects or measures a physical property and records, indicates, or otherwise responds to it. For example, the sensor can be an optical sensor. The optical sensor can be a camera, like a front-facing camera, such as within a tablet, a cellular phone, a 3-D optical sensor (e.g., LIDAR), or the like. As another example, the sensor can be a sticker-type sensor attachable on or near skin of a patient. The sticker-type sensor can be an inertial sensor, comprising an accelerometer, a gyroscope, a magnetometer, an optical sensor, a haptic motor, or the like.

As used herein, the terms "subject" and "patient" can be used interchangeably and refer to any vertebrate organism. As an example, the subject or patient can be any human undergoing physical therapy.

II. Overview

During physical rehabilitation, exercise bands of various resistances are assigned to patients for use with one or more exercises. Traditionally, the assignment of the exercise bands is based on the rating of the band selected based on intermittent monitoring of exercises and patient feedback. However, there is no measuring device, system, or method that exists today that is truly precise and accurate in the measurement of the pull force a patient exerts on the band during an exercise.

Described herein is an accurate and precise measure of the pull force. The measure is based on a solution that uses calculations and directed movements to record a patient's pull force based on motion with an exercise band and determine angles and movement of the patient who is pulling on the band. An instruction can be provided to a patient to perform a directed movement with the exercise band. Then exercise data can be received from at least one sensor as the patient performs the directed movement with an exercise band. The pull force can be calculated based on at least a portion of the exercise data. Physical therapists can utilize the pull force exerted on the resistance bands by the patient to better assign the appropriate resistance bands to patients for their exercises.

III. System

One aspect of the present disclosure can include a system 10 (shown in FIG. 1) for measuring a pull force on an exercise band used for an exercise during physical therapy. The system 10 provides an objective measure of the pull force, which allows the physical therapist to select an appropriate exercise band for the patient. This is important because the pull force may not match the tension rating of the exercise band due to differences in how the patient applies forces on the exercise band (i.e., rotating the band, twisting the band, applying force at one or more locations on the band, etc.). The adequacy of an exercise band can be determined by calculating the subject's pull force on the exercise band during a directed movement. If the exercise band is deemed inadequate (too easy or too difficult), then a healthcare provider, such as a physical therapist, can replace the inadequate exercise band with one that is better suited for the subject and the exercise.

The system 10 includes a controller 12 coupled to a sensor 14. The sensor 14 can include one or more sensors. For example, the sensor 14 can be an optical sensor (or a plurality of optical sensors). The optical sensor can be a camera, like a front-facing camera, such as within a tablet, a cellular phone, a 3-D optical sensor (e.g., LIDAR), or the like. As another example, the sensor 14 can be a sticker-type sensor attachable on or near skin of a patient (or any other type of sensor adapted to be placed on or near a subject's skin). The sticker-type sensor (or any other type of sensor adapted to be placed on or near a subject's skin) can be an inertial sensor, comprising an accelerometer, a gyroscope, a magnetometer, an optical sensor, a haptic motor, or the like.

The system 10 can also include a display 19 (e.g., a video display, a pictorial display, an audio display, or the like) coupled to the controller 12. The couplings can be connections that are wired and/or wireless. In some instances, the coupling can be through a cloud-based provider-application that can receive the data from the sensor 14 (e.g., a cloud-based database) and/or display a dashboard on the display 14 that includes some indication of the pull force. The controller 12 can be a general computing device, such as a computer, a smartphone, or a tablet. The controller 12 and the display 19 can be integrated, or the controller 12 and the display 19 can be separate devices.

The controller 12 includes a non-transitory memory 16 configured to store instructions and a processor 18 that can access the non-transitory memory 16 (e.g., a hardware memory, not a transitory signal) and execute the instructions. The non-transitory memory 16 can store data, including exercise data received from the sensor 14 (or the plurality of sensors). The controller 12 can include a wireless transmitter (not shown), which can allow communication with the plurality of the sensor 14 (or the plurality of sensors and/or the display 19. The wireless transmitter can transmit data according to one or more wireless protocols, including Bluetooth, cellular, WiFi, or the like. In some instances, the controller 12 can also include a wired connection for data transmission.

Figure 2:
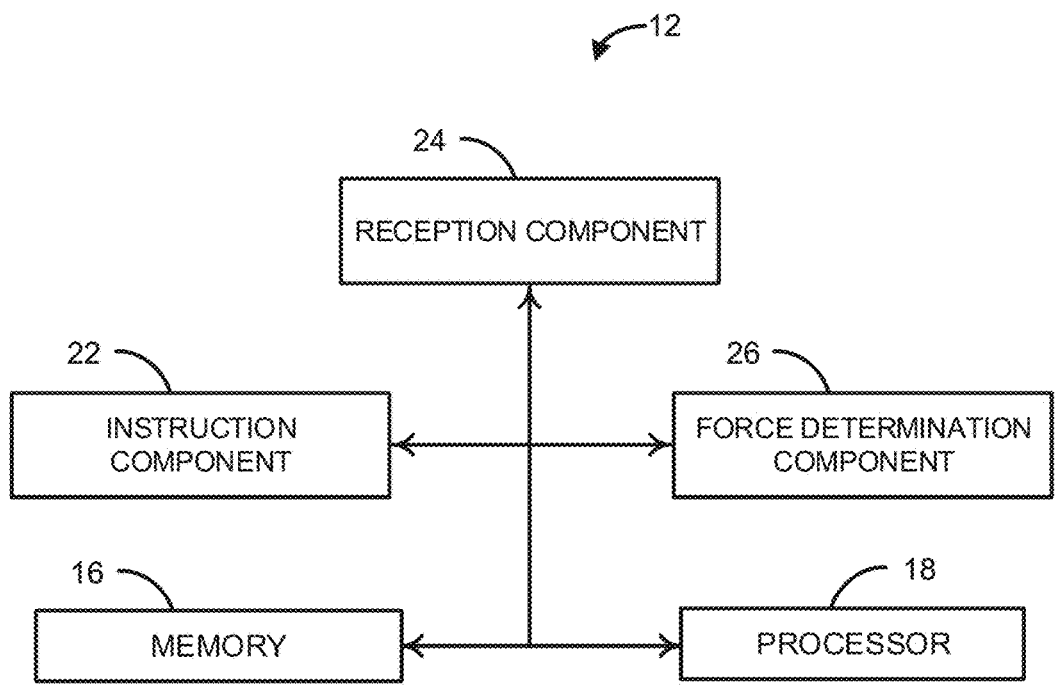
FIG. 2 is a diagram showing a detailed view of the controller from FIG. 1.

FIG. 2 shows the controller in more detail. In addition to the memory 16 and the processor 18, the controller 12 also includes an instruction component 22, a reception component 24, and a force determination component 26. The instruction component 22 can instruct a subject to perform a directed movement with an exercise band. As an example, the instruction component 22 can be linked to the display 19 to provide the instructions related to the directed movement to the patient. The instruction component 22 can also include other instructions including, but not limited to, instructions on how to wear/use the sensor 14 (or the plurality of sensors, instructions on how to use the system 10, and instructions on how to communicate with a healthcare provider. The instructions can be audio and/or visual and can be presented by the display 19.

The reception component 24 can receive the exercise data from the sensor 14 (or each of the plurality of sensors) as the subject performs the directed movement. The exercise data can include, but is not limited to, position data, rotation data, and movement data. The reception component 24 can include a wireless transmitter (not shown) and/or a wired connection to the sensor 14 (or the plurality of sensors). The force determination component 26 can calculate a pull force of the subject on the exercise band based on at least a portion of the exercise data received by the reception component 24. For example, the force determination component 26 can utilize one or more mathematical relationships to determine the force. The force determination component 26 can determine the adequacy of the exercise band based on the calculated pull force.

Figure 3:
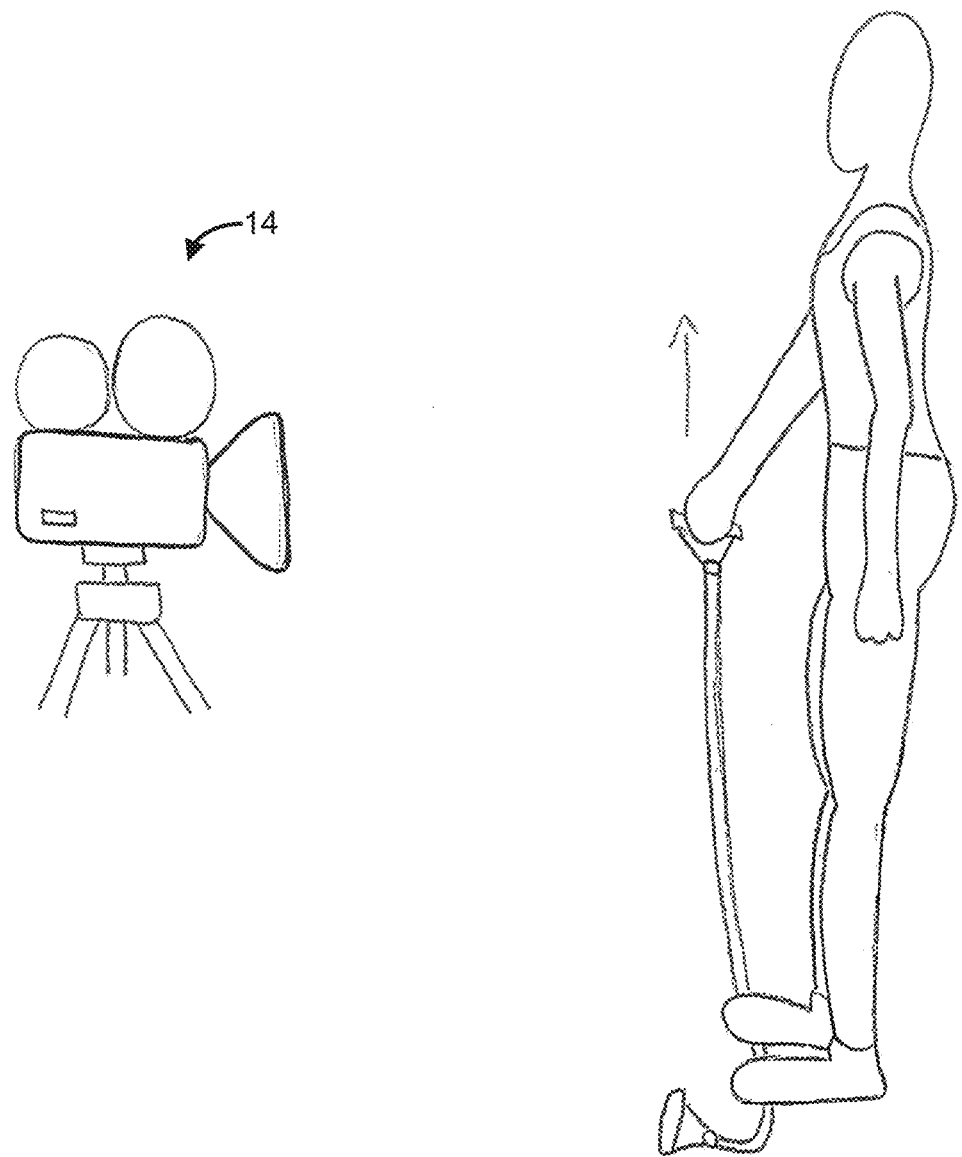
FIG. 3 is an illustration showing an example of a camera acting as the sensor of FIG. 1.
Figure 4:
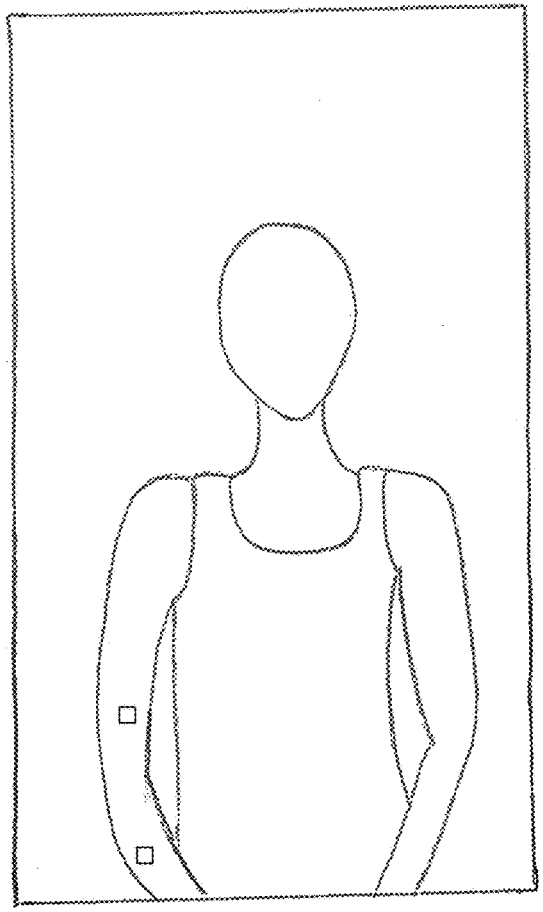
FIG. 4 is an illustration showing examples of how the sensor of from FIG. 1 can be a plurality of sensors worn on a subject around a knee or an elbow.
Figure 4:
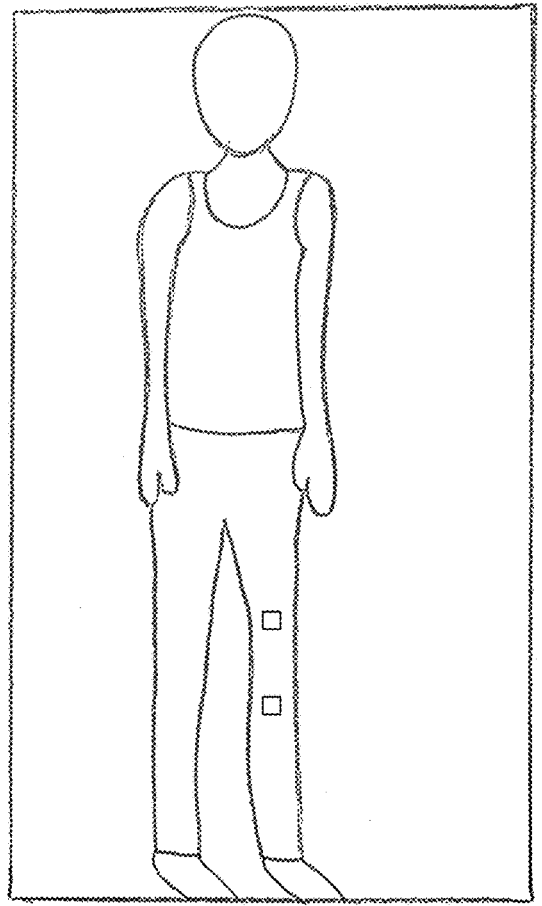

Referring again to FIG. 1, as an example, the sensor 14 can be one or more optical sensors FIG. 3). As another example, the sensor 14 can be a plurality of sensors can be adapted to be placed on or near a subject's skin (FIG. 4). For example, the plurality of sensors can be placed directly on a subject's skin or on/within tight fitting clothing worn by the subject. The plurality of sensors can be reusable, i.e., the same sensors can be worn for multiple rehabilitation sessions and can be placed at different locations. The plurality of sensors may be attached to the subject with any mechanism that can attach to skin or to cloth, the attachment mechanism can include, but is not limited to, an adhesive, a bandage, or a Velcro material.

Each of the plurality of sensors 14 transmits exercise data to the controller 12 when the subject uses the exercise band. The exercise data can be transmitted through a wired or a wireless connection. Each of the plurality of sensors 14 comprise, but are not limited to, at least one of an inertial sensor (e.g., an accelerometer, a gyroscope, a magnetometer, or the like) and an optical sensor. Optionally, at least one of the plurality of sensors 14 may include a haptic motor that provides an alert when the subject moves out of range of the directed movement. The exercise data transmitted by each of the plurality of sensors 14 can include, but is not limited to, position data, rotation data, and movement data of each of the plurality of sensors 14. Optionally, secondary sensors, such as a heart rate monitor, a blood pressure monitor, a smart watch, or an exercise tracker, can also transmit data to the controller 12. This data may include heart rate, blood pressure, dynamic movement information, and biometric information. The controller 12 may use the data to help determine the pull force and/or if an exercise band is inadequate for a directed movement.

In one aspect of this example, the plurality of sensors can be three sensors. A first sensor can be adapted to be placed on a sternum of a subject, a second sensor can be adapted to be placed proximal to a joint of the subject, and a third sensor can be adapted to be placed distal to the joint of the subject. In this aspect, the third sensor may include the haptic motor to alert the subject when the subject moves out of range. The alert may be tactile and/or audio. The joint of the subject can be a joint requiring rehabilitation, a joint near a muscle or bone requiring rehabilitation, or a joint determined to accurately reflect the subject's pull force on an exercise band during the directed movement. FIG. 4 shows examples of how the sensors can be placed when the joint is an elbow, at 32, and when the joint is a knee, at 34. The joint can be, but is not limited to, a knee, an elbow, an ankle, a hip, a wrist, a spine, a foot, or a shoulder.

In example 32 of FIG. 4, a first sensor is placed on a tight-fitting shirt worn over the sternum of the subject, a second sensor is placed on the skin of the subject's upper arm, and a third sensor is placed on the skin of the subject's forearm. In example 34 of FIG. 3, a first sensor is also placed on a tight fitting shirt worn over the sternum of the subject, a second sensor is placed on a tight fitting pant worn over the subject's thigh, and the third sensor is placed on the tight fitting pant worn over the subject's shank. In both examples of FIG. 3 each of the sensors may alternatively by placed directly on the skin or on any tight clothing worn by the subject. In other aspects of the present disclosure more or less sensors can be worn. In the example shown in FIG. 3, it should be noted that more than three sensors or less than three sensors may be worn by the subject (the number of sensors is not intended to be limiting). Additionally, each of the sensors can be either on the skin or on the tight fitting clothes.

Referring again to FIG. 1 the display 19 may be used in conjunction with the controller 12 to convey instructions to the subject to perform the directed movement with the exercise band. The display 19 can be any type of display suitable for displaying text, images, graphics, and/or other visual output including, but not limited to, a standard display screen (e.g., LCD, CRT, OLED, TFT, plasma, etc.), a touch screen, a wearable display, a projection display, a head-mounted display, a holographic display, or a virtual reality display. The display 19 can be physically attached to the controller 12 or remote from the controller 12. The display 19 can be adapted to present audio and/or visual directions to the subject related to the directed movement. Optionally, the display 19 may also be adapted to present other audio and/or visual directions such as directions for communicating with a healthcare provider, directions for monitoring personal progress, or directions for providing payment and insurance information.

Figure 5:
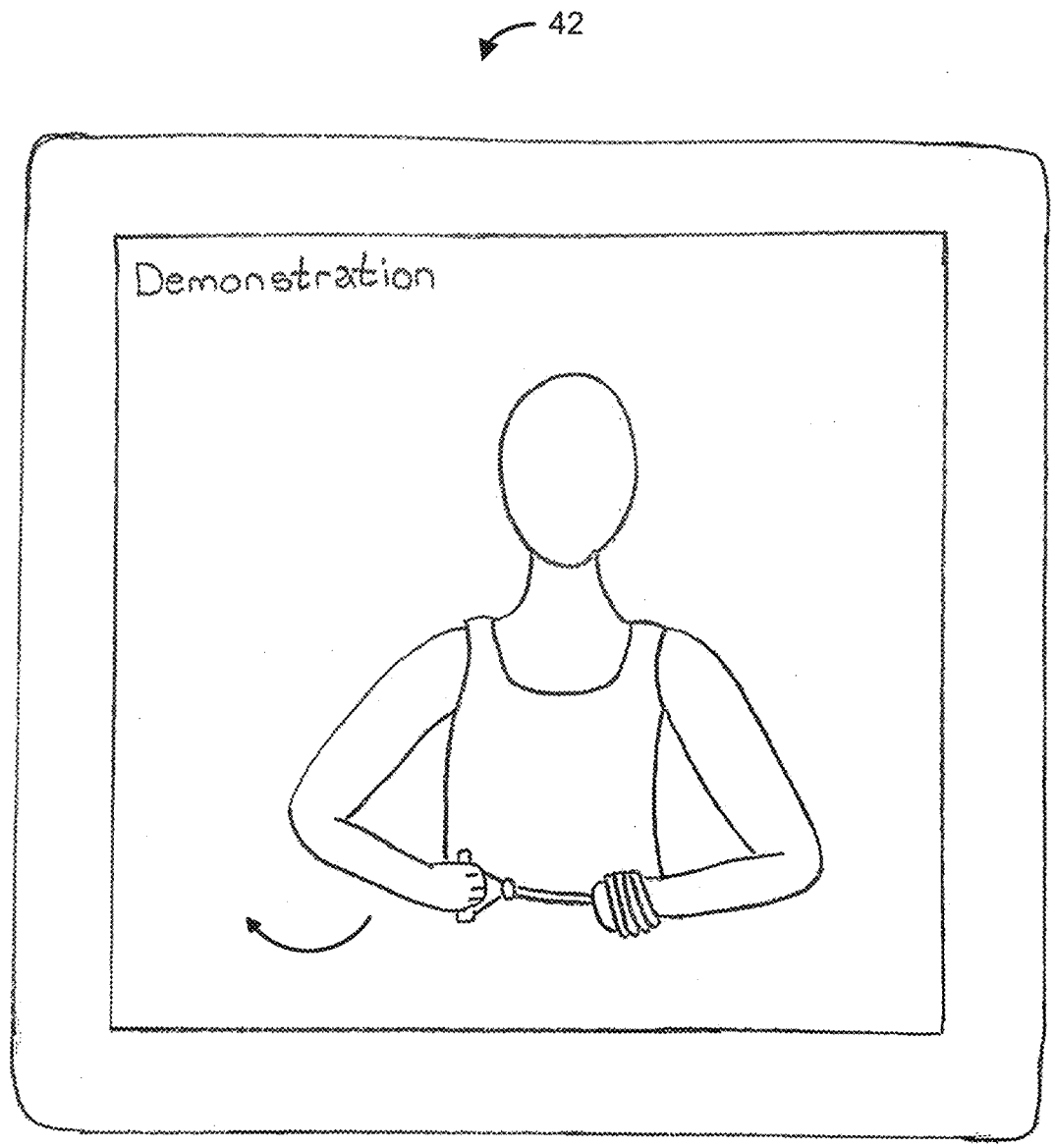
FIG. 5 is an illustration showing an animated figure on the display from FIG. 1 performing a directed movement.

In example 42 of FIG. 5 the display 19 shows an animated figure demonstrating and completing a directed movement with an exercise band. The animated figure can be two dimensional or three dimensional and can animated or a video of a human. The directed movement can be shown as a continuous video or can be shown as a series of steps (i.e., in stop motion). The animated figure may be accompanied by an audio or written explanation of the directed movement. Optionally, the animated figure may also be adapted to demonstrate where and how to use/place the sensor 14 before the subject begins the directed movement. Additionally, the animation can be replayed automatically until the pull force is determined and/or based on a manual input.

Figure 6A:
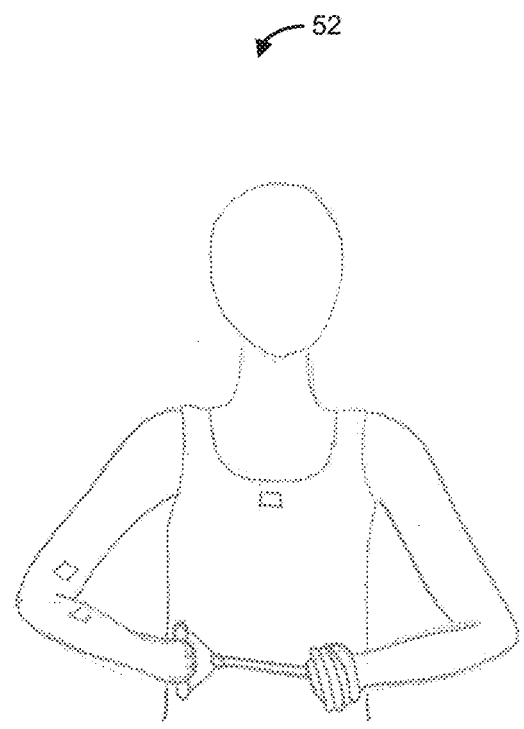
FIGS. 6A and 6B include illustrations of a subject completing the movement directed by FIG. 4.
Figure 6B:
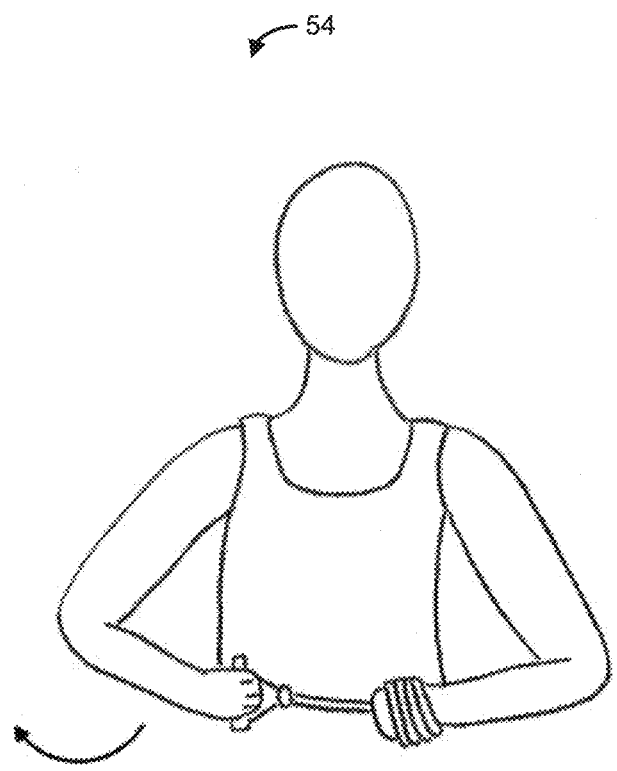

FIGS. 6A and 6B, show a subject using the exercise band. In FIG. 6A, a plurality of sensors placed on or near the skin of the subject (sensor 14) to record movements of the subject. In FIG. 6B, one or more optical sensors (sensor 14) record movements of the subject. The subject moves as instructed and as shown by the animated figure in FIG. 4. In both FIGS. 6A and 6B, the sensor 14 transmits exercise data to the controller 12 as the subject performs the directed movement. The controller 12 receives the exercise data and calculates the subject's pull force for the directed movement. The force determination component 26 of the controller 12 (as shown in FIG. 2) can calculate the pull force with the following example operations. Determining a first location when the subject starts the directed movement. At the start of the directed movement the exercise band is at full slack (i.e., the subject is exerting no pull force on the exercise band). A second location then is determined when the subject completes the directed movement (i.e., right before the subject begins to let slack back into the exercise band). An angle of motion is determined based on a change in position between the first location and the second location. The pull force is calculated based on a tension and elongation rating of the band, the change in position, and the angle of motion.

In another aspect of the present disclosure, the controller 12, through the instruction component 22, can direct the subject to repeat a directed movement for a set number of times. In non-limiting examples, the set number of times can be ten times, twelve times, or three groups of six times with a rest in between each of the three sets. The controller 12 can aggregate the force measurement calculations for the set number of movements (i.e., 10, 3×6, etc.). The controller 12 can determine the average pull force of the subject on the exercise band. The controller 12 can transmit to a healthcare provider at least one of the average pull force, an average range of motion, a number of completed repetitions (which may be different than the set number), and a pain level of the subject during the set number of directed movements.

Figure 7:
FIG. 7 includes illustrations of several types of exercise bands that may be used with the system from FIG. 1.
Figure 7:
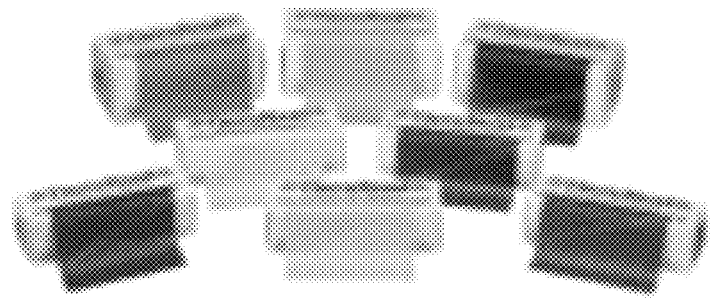

FIG. 7 shows examples of the multiple types of exercise bands that can be used by the subject in connection with the system 10. As shown in FIG. 6 the exercise bands can be hollow surgical tubing, or flat rubber bands. The exercise bands can include handles (as shown in FIGS. 6 and 8), ankle attachments, or other accessories. An exercise band can be any elastomeric material where the stress-strain curve acts in a near linear fashion. Exercise bands come in a variety of resistance levels, usually denoted by color, and can be categorized in levels such as light, medium, or heavy or categorized by a maximum tension and/or elongation rating. Different levels of exercise band can be used for different directed movements/exercises during rehabilitation and strength training. Levels of fitness, fatigue, and pain can cause changes in what level of exercise band should be used. The system described herein monitors by exercise type (directed movement) when an exercise band should be changed. In the case of rehabilitation, a healthcare provider (i.e., physical therapist) can by notified by the controller that the exercise band is inadequate for a given directed movement performed by the subject. The healthcare provider can then change the subject's specific plan of care to direct the subject to use a different exercise band the next time the subject does that directed movement.

Figures 8A, 8B:
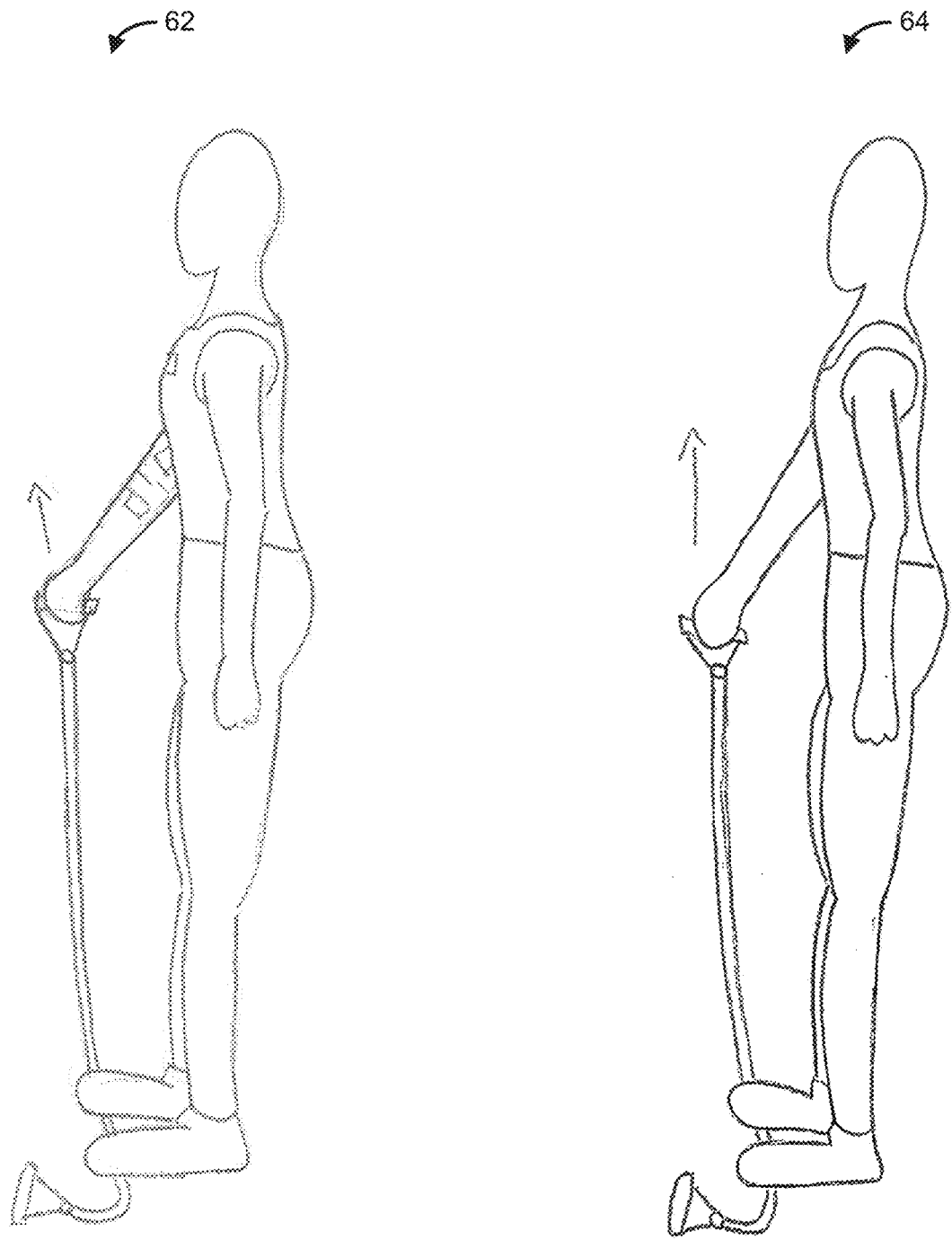
FIGS. 8A and 8B include illustrations of another directed movement that FIG. 4 can instruct the subject to perform.

As shown in FIGS. 8A and 8B, the controller 12 can instruct the subject to perform more than one directed movement with the exercise band—different exercises may require different exercise bands. Optionally, the controller 12 can instruct the subject through an entire routine of directed movements. The routine can be a plan of care determined by a physical therapist, Or, the routine can be an exercise plan determined by a physical trainer or conditioning coach. The routine can include a plurality of directed movements. In some examples, the directed movements may all use at least one exercise band. In other examples, the directed movements may use a mix of exercise bands, body weight, and other exercise equipment (free weights, strength and cardio machines, agility equipment, etc.). Optionally, the controller 12 can instruct the subject to alter the position of the sensor 14 (i.e., near a different joint or muscle group) before starting a directed movement.

In another aspect of the present disclosure, the controller 12 can notify a healthcare provider that an exercise band is inadequate for at least one of the directed movements performed by the subject. The exercise band may be inadequate for having too much or too little resistance. The healthcare provider may alter the subject specific plan of care based on the controller's adequacy decision. The controller 12 can communicate the altered subject specific plan of care to the subject. The controller 12 can also send data, to an electronical medical record or integrated billing and medical insurance software.

IV. Methods

Figure 9:
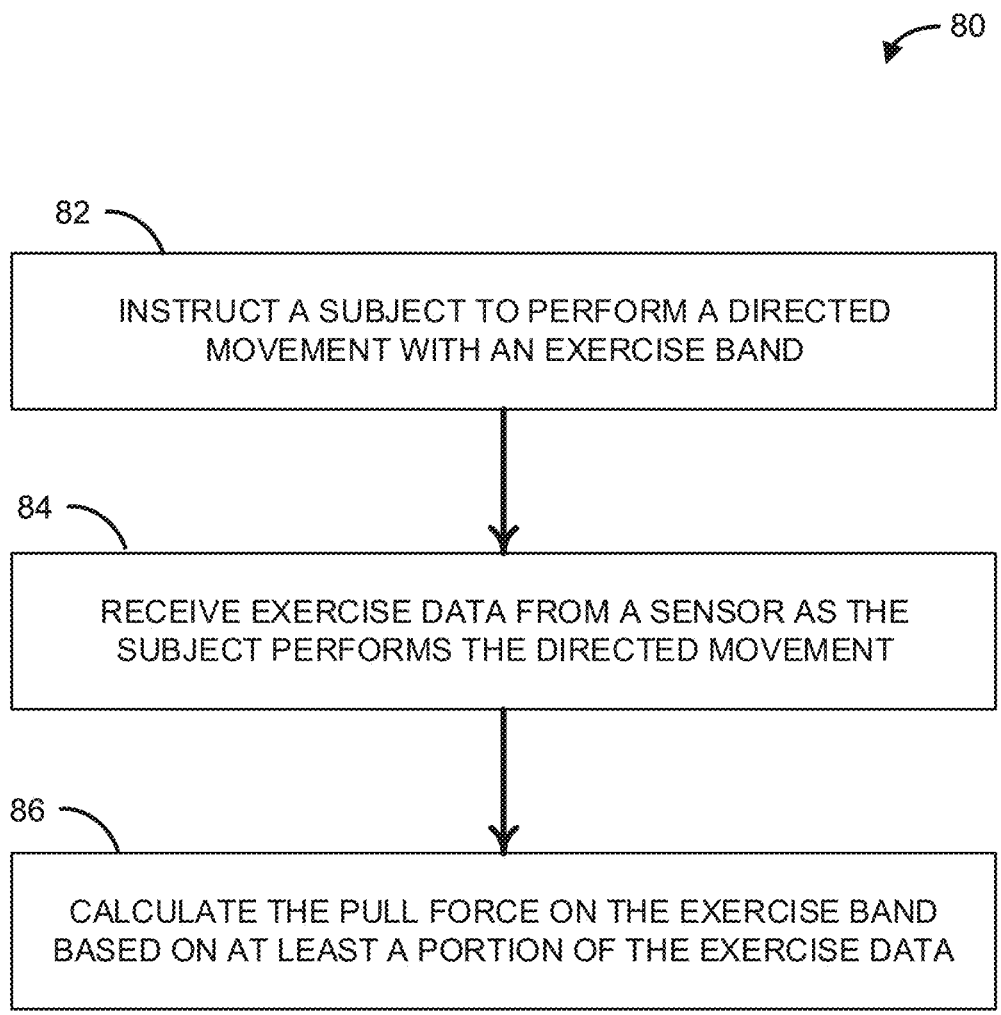
FIG. 9 is a process flow diagram showing a method for measuring a subject's pull force on an exercise band.
Figure 10:
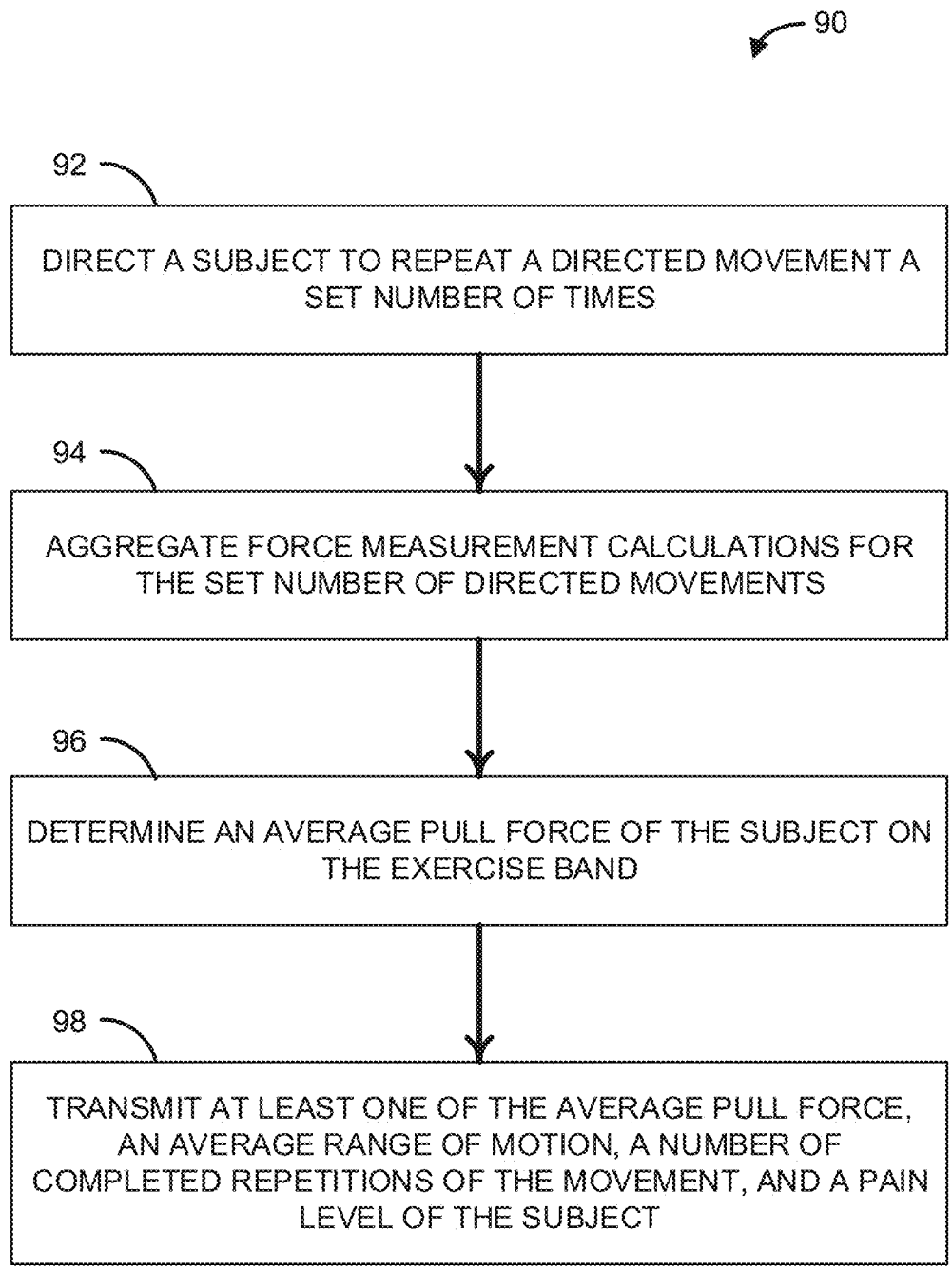
FIG. 10 is a process flow diagram showing a method for determining the adequacy of an exercise band for a directed movement.
Figure 11:
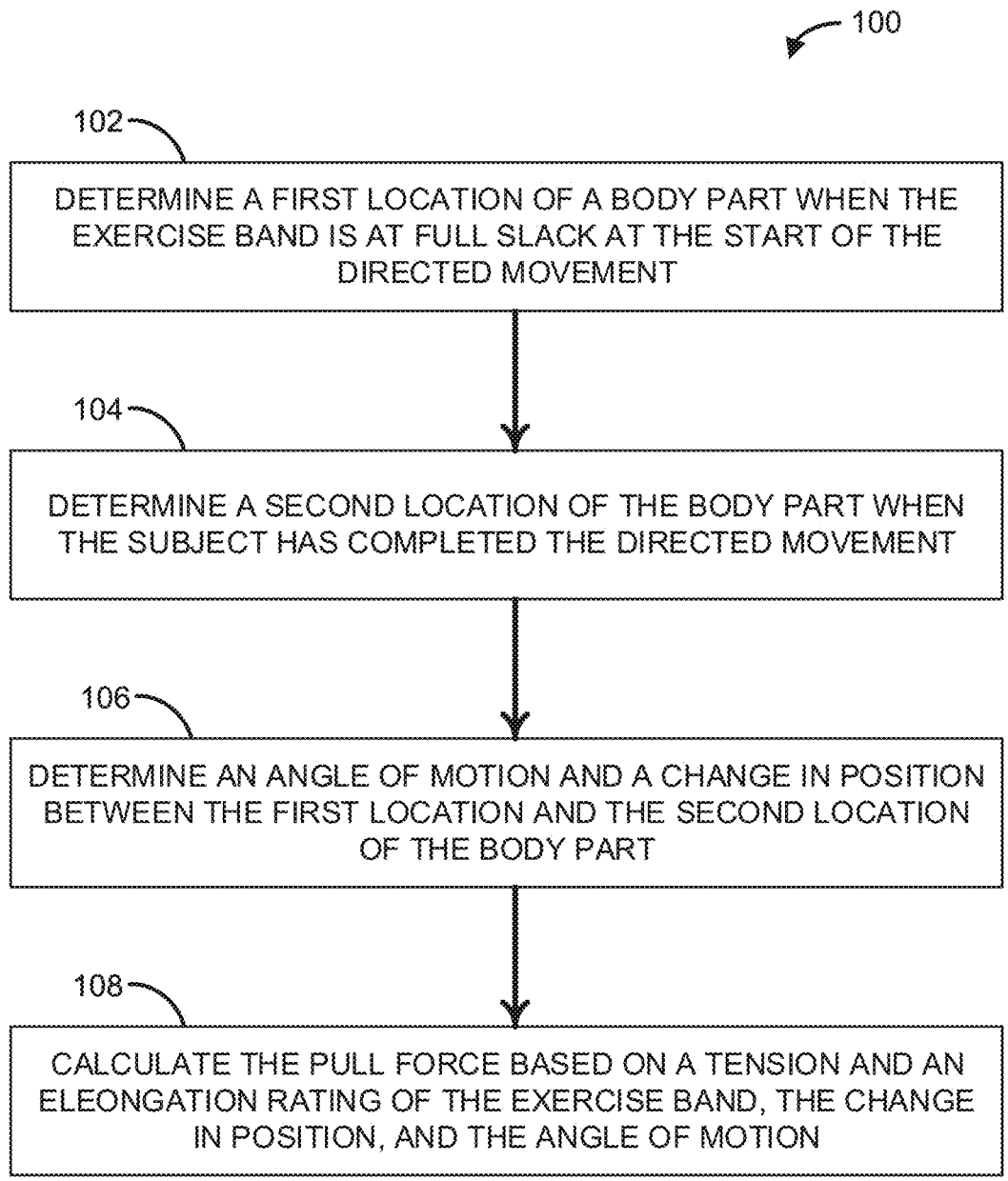
FIG. 11 is a process flow diagram showing a method for determining an average pull force on an exercise band for a set number of a directed movement.

Another aspect of the present disclosure can include methods 80, 90, and 100 as shown in FIGS. 9, 10, and 11 for measuring a pull force on an exercise band. For example, an exercise band can be determined to have too high or too low a resistance for a subject based on the subject's pull force on the exercise band.

The methods 80, 90, and 100 are illustrated as a process flow diagram with flow chart illustrations. For purposes of simplicity, the methods are shown and described as being executed serially; however, it is to be understood and appreciated that the present disclosure is not limited by the illustrated order, as some steps could occur in different orders and/or concurrently with other steps shown and described herein. Moreover, not all illustrated aspects may be required to implement the methods.

The methods 80, 90, and 100 can be executed by hardware—for example, the methods 80, 90, and 100 can be performed primarily by the controller 12 of system 10 of FIG. 1. One or more hardware elements of the controller 12 of system 10 can execute software routines to implement at least a portion of each of the methods. Additionally, one or more elements of the controller 12 of system 10 can include a non-transitory memory 16 to execute the software routines corresponding to at least the portion of the methods. Other components (display 19, instruction component 22, reception component 24, etc.) of system 10 of FIGS. 1 and 2 may also be used to facilitate the methods.

Referring now to FIG. 8, illustrated is a method 80 for measuring the pull force on an exercise band. At 82, the controller 12 instructs a subject to perform a directed movement with an exercise band. Optionally, a display 19 in communication with the controller 12 can present audio and/or visual directions to the subject related to the directed movement. The audio and/or visual directions can include the instructions at 82. The visual directions can include an animated figure (2D or 3D) completing the directed movement. At 84, the controller 12 receives exercise data from a sensor 14 (or a plurality of sensors) located on or near the skin of the subject as the subject performs the directed movement. The exercise data can comprise, but is not limited to, location data, rotation data, and movement data; this data can come from each of the one or more sensors. At 86, the controller 12 calculates the pull force on the exercise band based on at least a portion of the exercise data (e.g., a distance moved, a trajectory of motion, a resistance rating of the chosen exercise band, etc.). The controller 12 can determine the adequacy of the exercise band based on the pull force.

In one aspect of the present disclosure, when the one or more sensors are a plurality of sensors, the controller 12 can instruct the subject to place the plurality of sensors in location(s) on or near the subject's skin (i.e., on top of tight-fitting clothing). In one example, the plurality of sensors can be three sensors: a first sensor adapted to be placed on a sternum of a subject, a second sensor adapted to be placed proximal to a joint of the subject, and a third sensor adapted to be placed distal to the joint of the subject. The joint of the subject can be, but is not limited to, an elbow (as shown at 32 of FIG. 4), a knee (as shown at 34 of FIG. 4), an ankle, a hip, a wrist, a finger, a spine, a foot, or a shoulder.

Each of the plurality of sensors can comprise at least one of an accelerometer, a gyroscope, a magnetometer, and an optical sensor. In the above example, the third sensor can additionally include a haptic motor which alerts the subject when the subject moves out of range of the directed movement. The alert can be based on position data and can occur when the third sensor's change in position deviates too far from a pre-determined trajectory for the determined exercise. In other aspects of the present disclosure, the haptic motor can be included in any of the plurality of sensors.

In another aspect of the present disclosure, the one or more sensors can be a front-facing camera. The front-facing camera can be a predetermined distance away from the subject. The front-facing camera can be on a smart device or the controller. For example, the front-facing camera can be one or more tablets, one or more cell phones, one or more standalone 3-D optical sensors (e.g., LIDAR), or the like.

Referring now to FIG. 10, illustrated is a method 90 for measuring an aggregate pull force over a given number of the same directed movement. At 92, the controller 12, directs a subject to repeat a directed movement a set number of times. In non-limiting examples, the set number of times can be ten times, twelve times, or three groups of six times with a rest in between each of the three sets. Optionally, the display 19 in communication with the controller 12 can present the directions as audio and/or visual directions. At 94, the controller 12 can aggregate the force measurement calculations for the set number of directed movements. In order to aggregate the force measurement calculations, the controller 12 can determine a force measurement for each of the set number of directed movements and then aggregate the measurements together. The aggregation can be, but is not limited to, an average, a medium, or a mode of the force measurement of each of the set number of the directed movement. At 96, the controller 12 can determine an average pull force of the subject on the exercise band. The average pull force is determined based on the aggregated force measurement calculations. At 98, the controller 12 can transmit at least one of the average pull force, an average range of motion, a number of completed repetitions of the directed movement (which may not be the set number), and a pain level of the subject. The results can be transmitted to a healthcare provider, such as a physical therapist or occupational therapist, or to an exercise professional, such as a trainer or a coach.

Referring now to FIG. 11, illustrated is a method 100 for determining a pull force on an exercise band. At 102, the controller 12 can determine a first location of a body part when the exercise band is at full slack at the start of the directed movement. Full slack occurs when the subject is not exerting any pull force on the exercise band, but the exercise band is fully extended. At 104, the controller 12 can determine a second location of the body part when the subject has completed the directed movement. The directed movement is complete when the exercise band is at its most elongated. The controller 12 may receive continuous position data from the one or more sensors (e.g., sensor 14). In one aspect of the present disclosure, the controller 12 may determine the first position and the second position using a comparison to the continuous position data (i.e., as the two points furthest from each other). At 106, the controller 12 can determine an angle of motion and a change in position between the first location and the second location. At 108, the controller 12 can calculate the pull force based on a tension and an elongation rating of the exercise band, the change in position, and the angle of motion.

In another aspect of the present disclosure, the controller 12 can communicate a subject specific plan of care to rehabilitate a joint. The subject specific plan of care can comprise a plurality of directed movements and sets of directed movements. The controller 12 can notify a healthcare provider that an exercise band is inadequate for at least one of the directed movements performed by the subject. The exercise band may be inadequate for having too much or too little resistance. The healthcare provider may alter the subject specific plan of care based on the controller's adequacy decision. The controller 12 can communicate the altered subject specific plan of care to the subject.

From the above description, those skilled in the art will perceive improvements, changes and modifications. Such improvements, changes and modifications are within the skill of one in the art and are intended to be covered by the appended claims. All patents, patent applications, and publications cited herein are incorporated by reference in their entirety.

The following is claimed:

1. A system comprising:
    an optical sensor configured to record motion of a subject and transmit a recording of the motion;
    a display adapted to present audio and/or visual directions to the subject related to a directed movement; and
    a controller comprising:
        a non-transitory memory storing instructions; and
        a processor to execute the instructions stored in the memory to at least:
            instruct the subject, via the display, to perform the directed movement;
            receive the recording of the motion from the optical sensor as the subject performs the directed movement and determine exercise data from the recording of the motion; and
            calculate a pull force of the subject for the directed movement based on at least a portion of the exercise data to determine an adequacy of the directed movement for the subject based on the pull force,
            wherein when the directed movement is determined to be inadequate, instruct the subject, via the display, to alter the directed movement.

2. The system of claim 1, wherein the subject is instructed, via the display, to perform the directed movement as a routine of a plurality of directed movements.

3. The system of claim 1, wherein the display shows an animated figure completing the directed movement.

4. The system of claim 1, wherein the system further comprises:
    at least one sensor adapted to be placed on or near a subject's skin and configured to record the motion of the subject and transmit additional exercise data when the subject performs the directed movement, wherein the additional exercise data is used to calculate the pull force.

5. The system of claim 4, wherein the at least one sensor comprises:
    a first sensor adapted to be placed on a sternum of a subject;
    a second sensor adapted to be placed proximal to a joint of the subject; and
    a third sensor adapted to be placed distal to the joint of the subject.

6. The system of claim 4, wherein the at least one sensor comprises an at least one of an inertial sensor, comprising an accelerometer, a gyroscope, and/or a magnetometer, and an optical sensor.

7. The system of claim 4, wherein the at least one sensor further comprises a haptic motor that provides an alert when the subject moves out of range of the directed movement.

8. The system of claim 1, wherein the optical sensor comprises a camera facing the subject at a predetermined distance from the subject.

9. The system of claim 1, wherein the exercise data comprises position data, rotation data, and movement data.

10. The system of claim 1, wherein the processor further executes instructions to:
 direct the subject to repeat the directed movement for a set number of times;
 aggregate force measurement calculations for the set number of movements;
 determine the average pull force of the subject during the directed movement; and
 transmit to a healthcare provider the average pull force, an average range of motion, a number of completed repetitions, and a pain level of the subject.

11. A method comprising:
 instructing, by a controller comprising a processer via a display device, a subject to perform a directed movement, wherein the display device is adapted to present audio and/or visual directions to the subject related to the directed movement;
 receiving, by the controller, a recording of motion of the subject recorded by an optical sensor as the subject performs the directed movement;
 determining, by the controller, exercise data from the recording of the motion of the subject;
 calculating, by the controller, a pull force of the subject during the directed movement based on at least a portion of the exercise data;
 determining, by the controller, an adequacy of the directed movement for the subject based on the pull force; and
 when the directed movement is determined to be inadequate, instructing, via the display device, the subject to alter the directed movement.

12. The method of claim 11, further comprising:
 directing, by the controller and the display, the subject to repeat the movement for a set number of times;
 aggregating, by the controller, force measurement calculations for the set number of movements; and
 determining, by the controller, the average pull force of the subject.

13. The method of claim 12, further comprising:
 transmitting, by the controller, to a healthcare provider at least one of the average pull force, an average range of motion, a number of completed repetitions, and pain level of the subject.

14. The method of claim 11, wherein the display shows an animated figure completing the directed movement.

15. The method of claim 11, further comprises:
 receiving, by the controller, additional exercise data from at least one sensor situated on or near the subject's skin and configured to transmit the additional exercise data when the subject performs the directed movement, wherein the additional exercise data is used to calculate the pull force.

16. The method of claim 15, further comprising:
 instructing, by the controller, the subject to place the at least one sensor in a location on or near the subject's skin, wherein when the at least one sensor is a plurality of sensors the locations comprise:
  a first sensor adapted to be placed on a sternum of a subject;
  a second sensor adapted to be placed proximal to a joint of the subject; and
  a third sensor adapted to be placed distal to the joint of the subject.

17. The method of claim 15, wherein the at least one sensor comprises at least one of an inertial sensor, comprising an accelerometer, a gyroscope, and/or a magnetometer, and an optical sensor.

18. The method of claim 11, wherein the exercise data comprises position data, rotation data, and movement data of each of the plurality of sensors.

19. The method of claim 11, wherein calculating the pull force further comprises:
 determining a first position of at least a portion of the subject when the subject starts the directed movement;
 determining a second position of the at least the portion of the subject when the subject completes the directed movement;
 determining an angle of motion and a change in position between the first location and the second location; and
 calculating the pull force based on at least the change in position and the angle of motion.

20. The method of claim 11, further comprising:
 communicating, by the controller, a subject specific plan of care to rehabilitate a joint comprising of a plurality of directed movements; or
 notifying, by the controller, a health care provider that the directed movement performed by the subject is inadequate.

* * * * *